United States Patent
Jackson et al.

(10) Patent No.: US 10,189,378 B2
(45) Date of Patent: Jan. 29, 2019

(54) MOTOR VEHICLE SEATING ARRANGEMENT

(71) Applicant: Ford Global Technologies, LLC, Dearborn, MI (US)

(72) Inventors: Daniel T. Jackson, Basildon (GB); Ken George Dell, Rainham (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/927,438

(22) Filed: Mar. 21, 2018

(65) Prior Publication Data

US 2018/0326871 A1    Nov. 15, 2018

(30) Foreign Application Priority Data

May 15, 2017 (GB) .................................. 1707726.4

(51) Int. Cl.
| | |
|---|---|
| *B60N 2/28* | (2006.01) |
| *B60N 2/30* | (2006.01) |
| *B60N 2/02* | (2006.01) |
| *B60N 2/01* | (2006.01) |
| *B60N 2/12* | (2006.01) |

(52) U.S. Cl.
CPC ............. *B60N 2/0292* (2013.01); *B60N 2/01* (2013.01); *B60N 2/012* (2013.01); *B60N 2/12* (2013.01); *B60N 2/283* (2013.01); *B60N 2/3011* (2013.01); *B60N 2/3097* (2013.01); *B60N 2205/30* (2013.01)

(58) Field of Classification Search
CPC ..... B60N 2/283; B60N 2/3097; B60N 2/0292
See application file for complete search history.

(56) References Cited

U.S. PATENT DOCUMENTS

| 1,922,502 | A | * | 8/1933 | Scragg | ................. | B60N 2/3097 |
| | | | | | | 297/116 |
| 2,493,806 | A | * | 1/1950 | Dumas | ................. | B60N 2/3097 |
| | | | | | | 297/232 |
| 8,678,497 | B2 | * | 3/2014 | Kyogoku | ............... | B60N 2/206 |
| | | | | | | 297/232 |
| 9,352,676 | B1 | | 5/2016 | Wright et al. | | |
| 9,359,079 | B2 | * | 6/2016 | Scott | ................... | B64D 11/0601 |
| 2011/0109146 | A1 | * | 5/2011 | Ida | ...................... | B60N 2/01583 |
| | | | | | | 297/463.1 |

(Continued)

FOREIGN PATENT DOCUMENTS

| CA | 2515419 A1 | * | 8/2004 | ......... B60N 2/01583 |
| CA | 2835944 A1 | * | 12/2012 | ........... B60N 2/3011 |
| DE | 102006031886 A1 | * | 3/2007 | ............... B60N 2/01 |

(Continued)

*Primary Examiner* — Timothy J Brindley
(74) *Attorney, Agent, or Firm* — Vichit Chea; Price Heneveld LLP

(57) ABSTRACT

A motor vehicle having a motor vehicle seating arrangement mounted on a floor of the motor vehicle is disclosed in which a utility item in such as a central seat is supported by two spaced apart outer seats so that no floor engaging support is required for the central seat. Advantageously, the central seat is slidingly supported by the pair of outer seats so as to permit one of the outer seats to be slid forward to improve access to a row of seats mounted to the rear of the motor vehicle seating arrangement without moving the central seat or the other outer seat.

18 Claims, 13 Drawing Sheets

(56) References Cited

U.S. PATENT DOCUMENTS

2011/0175411 A1  7/2011  Wagner et al.

FOREIGN PATENT DOCUMENTS

| DE | 102008029261 A1 | 12/2009 |
| DE | 102007053958 B4 | 4/2016 |
| FR | 2816895 A1 | 5/2002 |
| KR | 20040042946 A | 5/2004 |

* cited by examiner

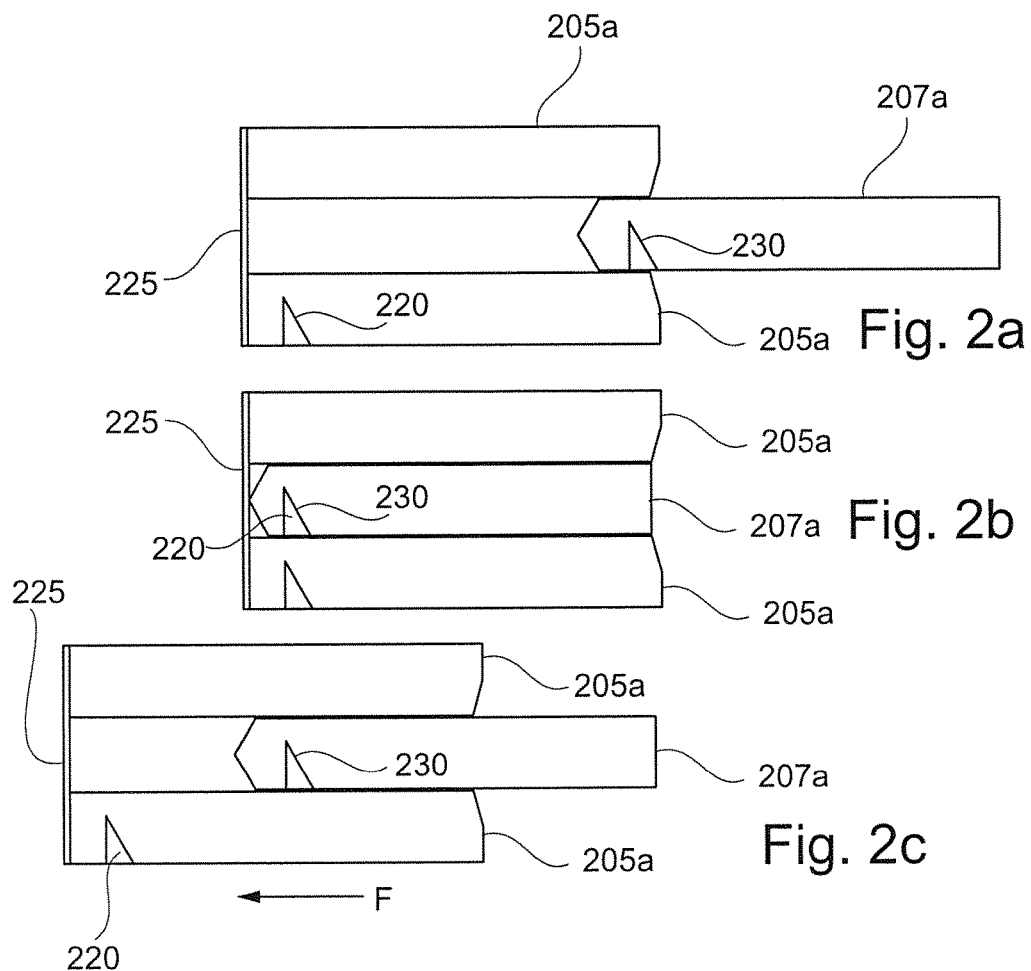
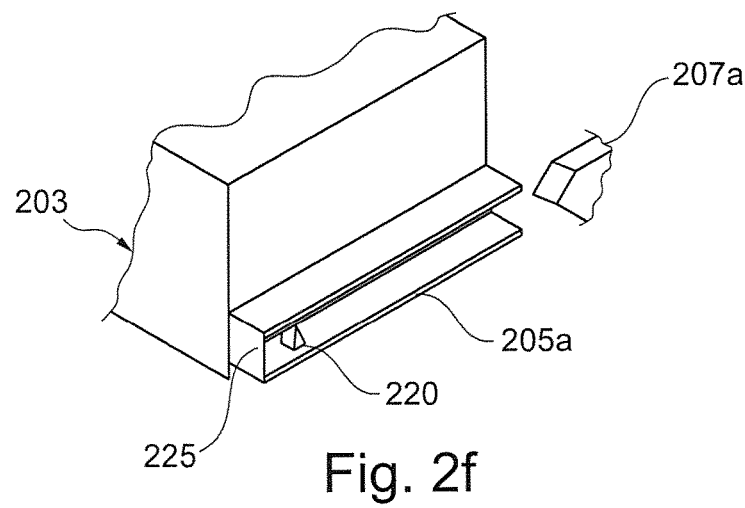

MOTOR VEHICLE SEATING ARRANGEMENT

FIELD OF THE INVENTION

The present invention generally relates to motor vehicles, and more particularly relates to a motor vehicle seating arrangement having improved utility.

BACKGROUND OF THE INVENTION

It is well known to provide a motor vehicle with two or more rows of seats for use by occupants of the motor vehicle. Particularly in the case of small commercial vehicles having passenger seating such as minibuses and for multi-purpose vehicles (MPVs) there is an increasing need to offer a high level of seating flexibility such as fore-aft movement of the seating and removal of one or more rows of seating. However, such seats are often heavy (circa 30 kg) due to the need to provide in many cases integral three point safety restraint anchorage points and the consequential need for substantial floor mounting structures sometimes referred to as a "seat leg" or a "seat pedestal."

The removal of such known seats for the purpose of loading long items is therefore difficult to achieve within the confines of a motor vehicle and so there is a need to provide a seat that is of lighter weight and so is easier to handle. In addition, to the foregoing there is an increased need to provide an item of utility for use by occupants of the motor vehicle such as for example, a table, an entertainment center, a storage bin, a storage locker and a need for increased in-vehicle storage particularly of long items. It would be desirable to provide a motor vehicle satisfying the aforementioned needs in a cost-effective manner.

SUMMARY OF THE INVENTION

According to a first aspect of the present invention there is provided a motor vehicle seating arrangement comprising a pair of outboard seats spaced apart to define therebetween a gap into which an item of utility is fitted, wherein the item of utility is supported solely by the two outboard seats.

The item of utility may be supported on a left hand side by a left hand side one of the pair of outboard seats. In which case, the item of utility may advantageously be slidingly supported on the left hand side by a sliding connection with the left hand side one of the pair of outboard seats.

The item of utility may be supported on a right hand side by a right hand side one of the pair of outboard seats. In which case, the item of utility may advantageously be slidingly supported on a right hand side by a sliding connection with the right hand side one of the pair of outboard seats.

The item of utility may be a central seat. The central seat may have a backrest and a seat base by which it is supported. The seat base of the central seat may be mounted on a seat support member and the seat support member may have a pair of recesses on a left hand side used to connect the seat support member on the left hand side to a pair of support pins forming part of a slide mechanism located on the left hand side one of the pair of outboard seats. The slide mechanism located on the left hand side one of the pair of outboard seats may be fastened to a seat pedestal of the left hand side one of the pair of outboard seats.

The seat base of the central seat may be mounted on a seat support member and the seat support member may have a pair of recesses on a right hand side used to connect the seat support member on the right hand side to a pair of support pins forming part of a slide mechanism located on the right hand side one of the pair of outboard seats. The slide mechanism located on the right hand side one of the pair of outboard seats may be fastened to a seat pedestal of the right hand side one of the pair of outboard seats.

Each of the outboard seats may have a backrest, a seat base and a seat pedestal for mounting the respective seat on a floor of a motor vehicle. Each of the seat pedestals may include a floor latch mechanism and, when the floor latch mechanism is fully released, the respective seat of which the pedestal forms a part may be removable from the motor vehicle. When the floor latch mechanism is partially released the respective seat of which the pedestal forms a part may be slideable in a fore-aft direction of the motor vehicle.

The item of utility may be one of a child seat, a table, a storage box, a storage locker and an entertainment center.

According to a second aspect of the invention there is provided a vehicle seating arrangement is provided. The vehicle seating arrangement includes a pair of outboard seats spaced apart in a vehicle to define therebetween a gap, and a central seat fitted in the gap and supported solely by the two outboard seats.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1b is a front right hand perspective view of support structures forming part of the motor vehicle seating arrangement shown in FIG. 1a;

FIG. 1c is a front left hand side perspective view on an enlarged scale of a right hand side outboard seat forming part of the motor vehicle seating arrangement shown in FIG. 1a;

FIG. 2a is a diagrammatic side view of support parts of a second embodiment of a motor vehicle seating arrangement showing a right hand slide rail of a central seat being inserted from the rear into a left hand side support rail of a right hand side outboard seat;

FIG. 2b is a diagrammatic side view similar to FIG. 2a but showing the right hand slide rail of the central seat located and latched in the left hand side support rail of the right hand side outboard seat in a normal latched seating position;

FIG. 2c is a diagrammatic side view similar to FIGS. 2a and 2b but showing the arrangement of the right hand slide rail of the central seat and the left hand side support rail of the right hand side outboard seat when the right hand side outboard seat has been moved forward into a rear access position;

FIG. 2f is a schematic pictorial view corresponding to FIG. 2a showing the right hand slide rail of the central seat prior to insertion into the left hand side support rail of the right hand side outboard seat;

DETAILED DESCRIPTION OF THE PREFERRED EMBODIMENTS

Figure 5:
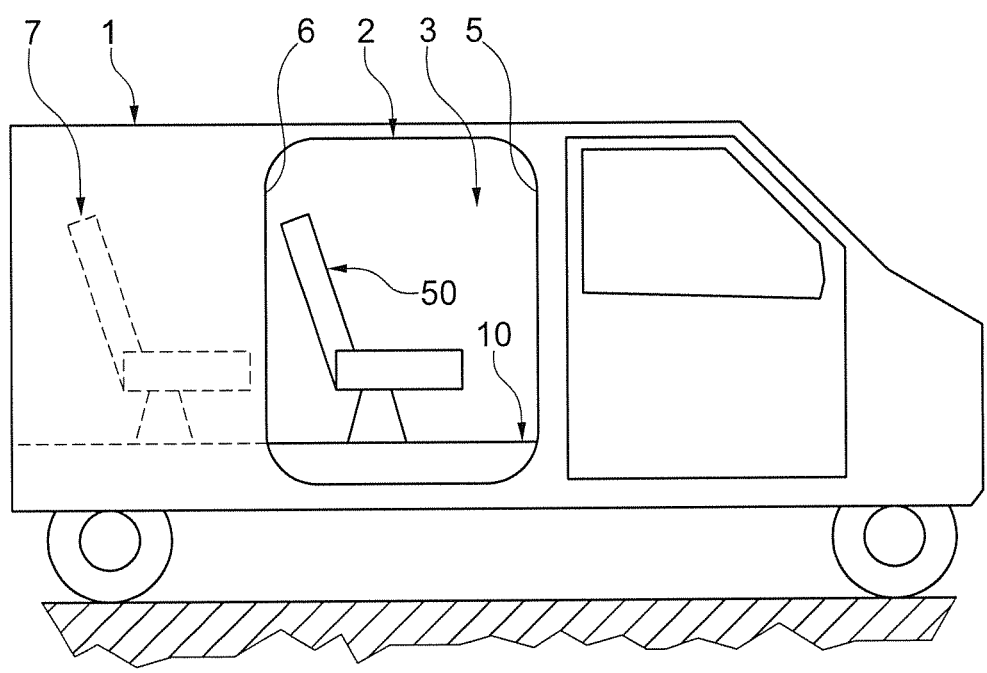
FIG. 5 is a side view of a motor vehicle showing a motor vehicle seating arrangement in accordance with the invention mounted in a passenger compartment of the motor vehicle.

With reference to FIG. 5, a motor vehicle 1 is shown having a side door aperture 2 to provide access to a passenger compartment 3 of the motor vehicle 1 in which is mounted a motor vehicle seating arrangement 50. The motor vehicle seating arrangement 50 has an item of utility in the form of a suspended central seat supported by a pair of outboard seats.

In the example shown in FIG. 5, the motor vehicle seating arrangement 50 is in the form of a second row of seating and is mounted on a floor 10 of the motor vehicle 1 so as be positioned in front of a third row of seating 7 (shown in dotted outline). The motor vehicle seating arrangement 50 is mounted so as to be positioned between a front upright 5 and a rear upright 6 which define front and rear edges of the side door aperture 2. Further embodiments 100; 200; 300 and 400 of motor vehicle seating arrangements suitable for use in place of the seating arrangement 50 are described hereinafter.

With reference to FIGS. 1a-1i there is shown a first embodiment of a motor vehicle seating arrangement 100. The seating arrangement 100 comprises of a right hand side outboard seat 105, a left hand side outboard seat 106 and an item of utility for use by occupants of the motor vehicle in the form of a central seat 107 that is located in a gap defined between the pair of outboard seats 105, 106. It will be appreciated that the seats 105, 106, 107 are mounted so as to face towards a front of the motor vehicle.

The right hand side outboard seat 105 has a backrest 102 and a seat base 103 and is mounted on a floor of a motor vehicle such as the floor 10 of the motor vehicle 1 shown in FIG. 5 via a seat pedestal 115. The seat pedestal 115 is moveably mounted on the floor 10 so as to be selectively slideable in a fore-aft direction of the motor vehicle 1 (see arrow F-A on FIG. 1c). That is to say, the seat pedestal 115 can be slid forwards or rearwards relative to the floor 10 of the motor vehicle 1. A release lever 117 is provided on the seat pedestal 115 to release floor latches (not shown) used to hold the seat pedestal 115 in position on the floor 10. By releasing these floor latches the seat pedestal 115 and the associated seat 105 can be removed from the motor vehicle 1.

The left hand side outboard seat 106 has a backrest 112 and a seat base 113 and is mounted on the floor 10 of the motor vehicle 1 via a seat pedestal 116. The seat pedestal 116 is moveably mounted on the floor 10 so as to be selectively moveable in a fore-aft direction of the motor vehicle 1. That is to say, the seat pedestal 116 can be slid forwards or rearwards relative to the floor 10 of the motor vehicle 1. A release lever 118 is provided on the seat pedestal 116 to release floor latches (not shown) used to hold the seat pedestal 116 in position on the floor 10. By releasing these floor latches, the seat pedestal 116 and the associated seat 106 can be removed from the motor vehicle 1.

The central seat 107 has a backrest 108 and a seat base 109 and is supported by the two outboard seats 105, 106 and is therefore referred to as a 'suspended seat' as there is no seat pedestal supporting the central seat 107. This has two primary advantages, firstly, there is a significant weight reduction due to the lack of a seat pedestal, and secondly, the space normally occupied by the seat pedestal provides additional storage space and allows long objects to pass under the central seat 107 of the seating arrangement 100 without hindrance from a seat pedestal.

In order to support the central seat 107 a seat support member 120 is fitted under the seat base 109 of the central seat 107. The seat support member 120 has a pair of spaced apart recesses on each longitudinal side that engage with support pins 125, 126 attached to a respective carriage 122, 137. The carriages 122, 137 are slideably mounted on the two seat pedestals 115, 116 via a pair of slide arms 127, 128 and 136, 138, respectively, and mounting brackets 129, 139.

Therefore, the central seat 107 is slidingly connected to the pair of outboard seats 105, 106 via a pair of slide mechanisms. A latching mechanism (not shown) is used to hold the central seat 107 in position on the four support pins 125, 126 and a release lever 121 is mounted on the seat support member 120 to selectively release the latching mechanism. The central seat 107 is removable from the seating arrangement 100 by using the release lever 121 to release the latching mechanism and then by lifting the central seat 107 out from between the two outboard seats 105, 106.

It will be appreciated that the support pins 125, 126 can be arranged to be retracted or folded away when the central seat 107 is removed so as to provide an unobstructed passage between the two outboard seats 105, 106. It will be further appreciated that the two support pins could be fixed to the seat support member 120 for engagement with recesses in the slide mechanisms associated with the outboard seats 105, 106.

One of the advantages of providing a sliding interconnection between the two outboard seats 105, 106 and the central seat 107 is that it allows either of the outboard seats 105, 106 to be moved forward to provide better access to a further row of seats to the rear of the seating arrangement 100.

Figure 1A:
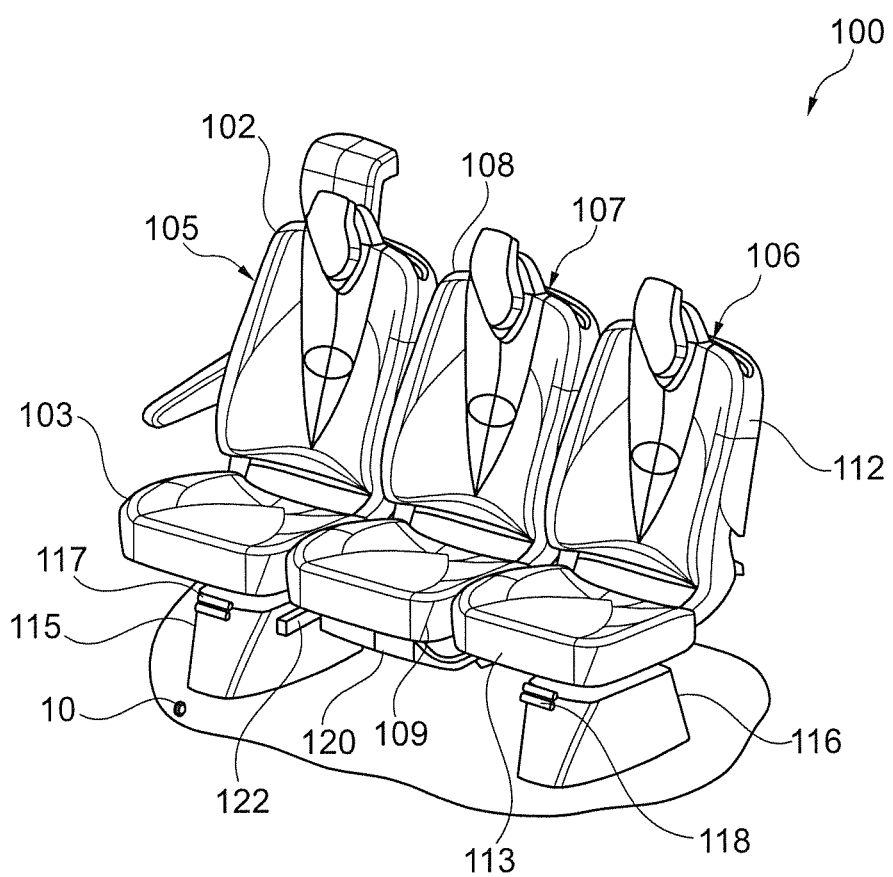
FIG. 1a is a front left hand perspective view of a first embodiment of a motor vehicle seating arrangement showing the seats of the motor vehicle seating arrangement in a normal seating position in which all of the seats making up the motor vehicle seating arrangement are aligned with one another.
Figure 1B:
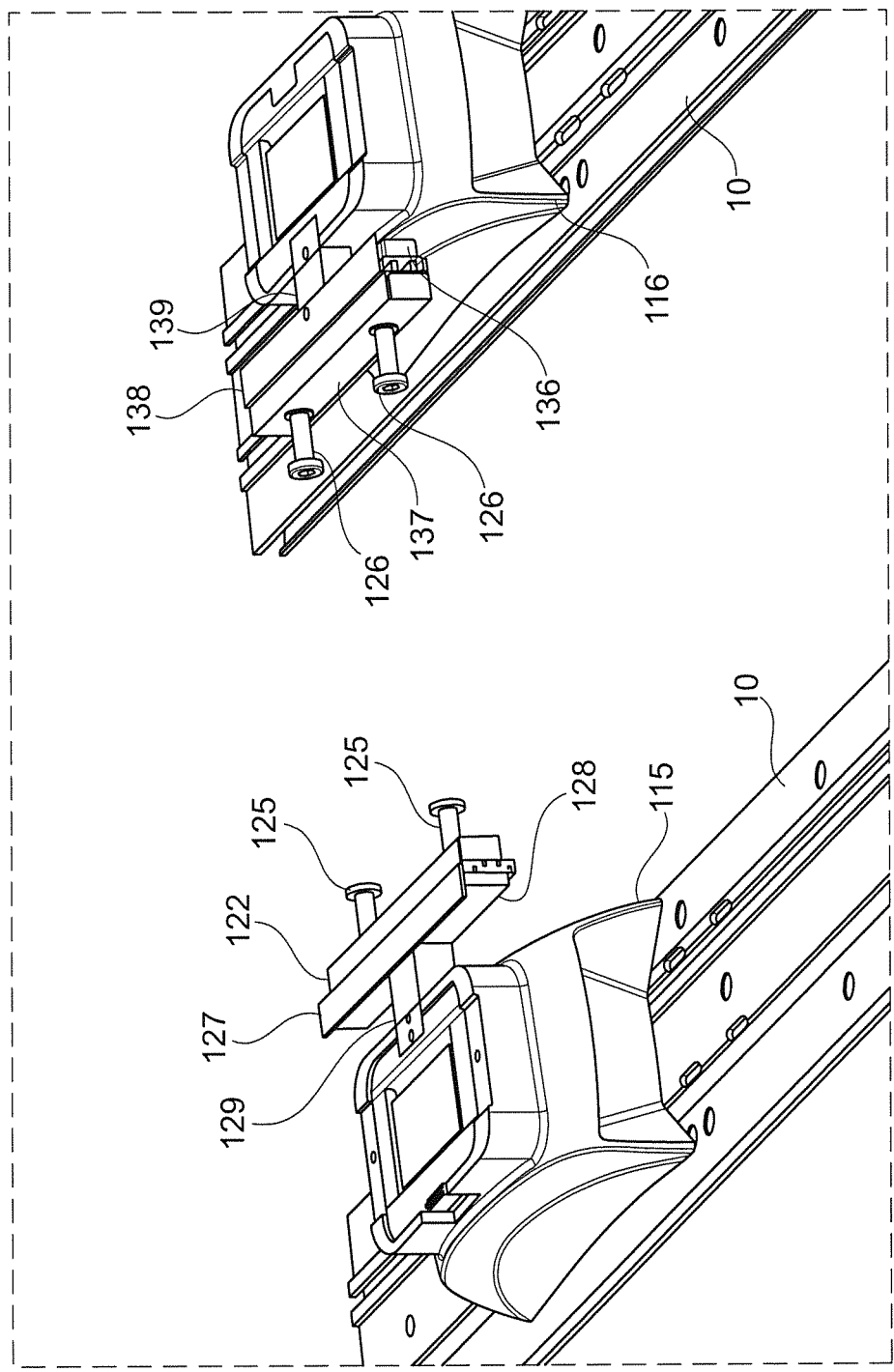
Figure 1C:
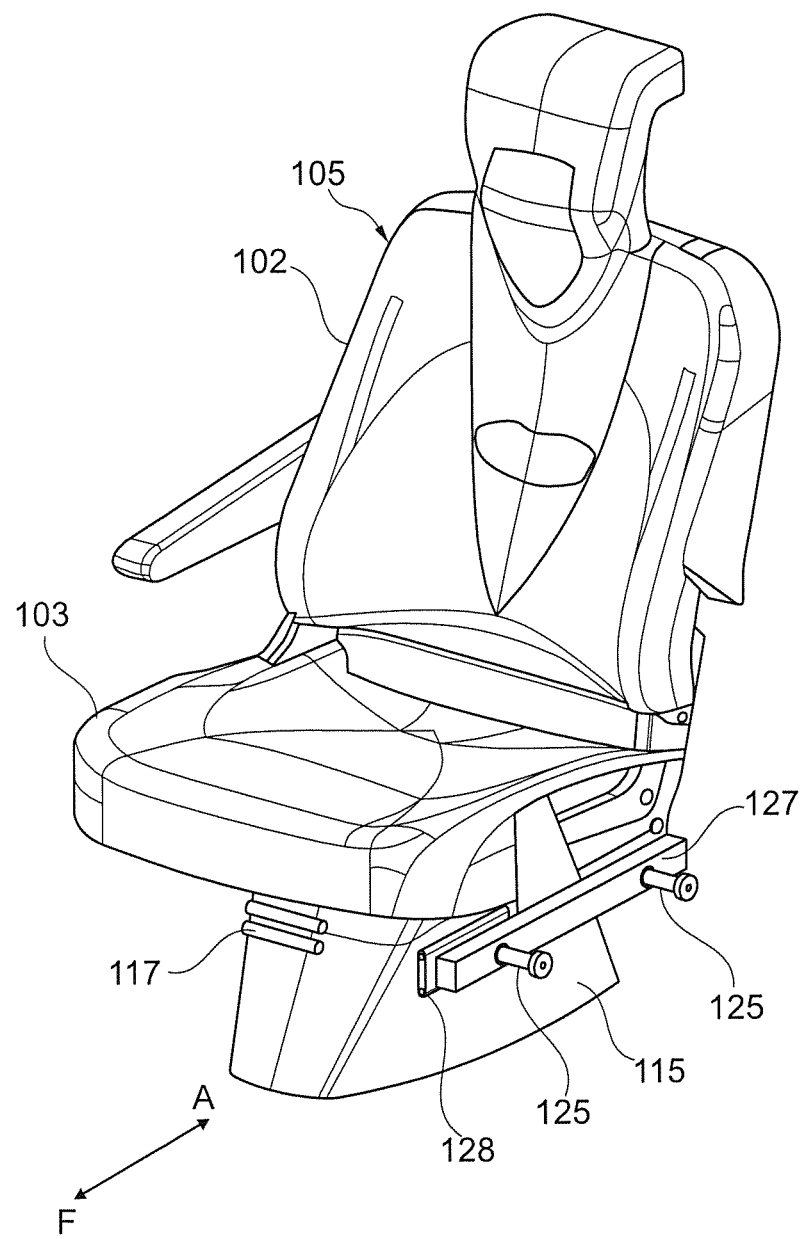
Figure 1D:
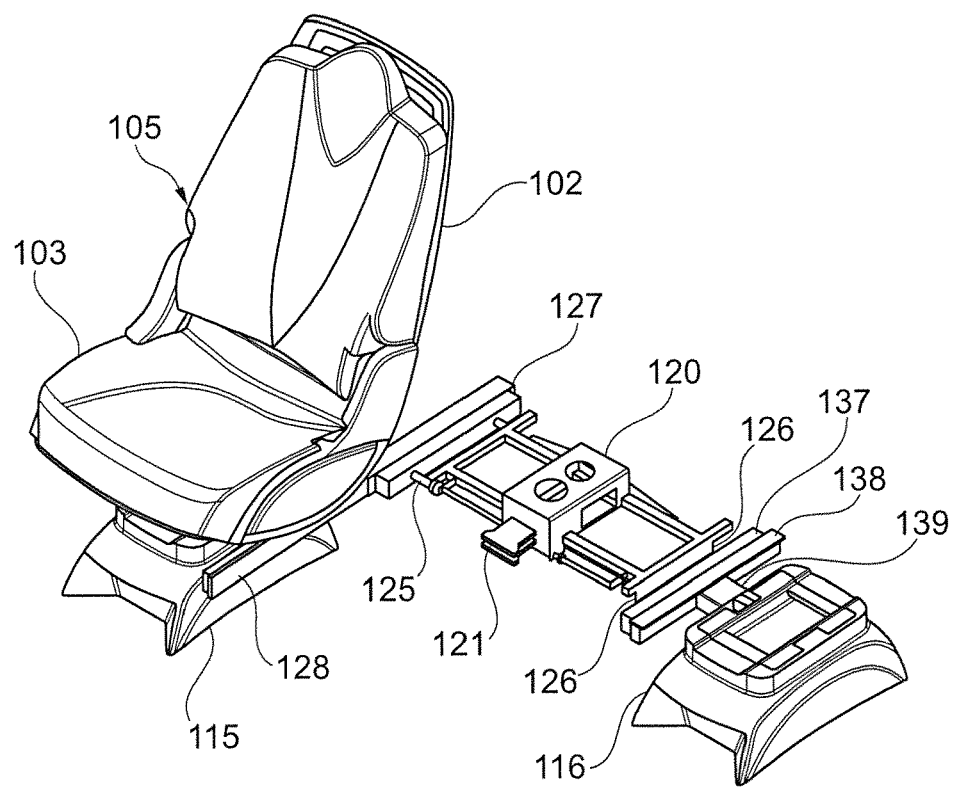
FIG. 1d is a front left hand perspective view of the right hand side outboard seat shown in FIGS. 1a and 1c showing the right hand side outboard seat in a rear access position and with the other seats removed to more clearly view the seat support structures.
Figure 1E:
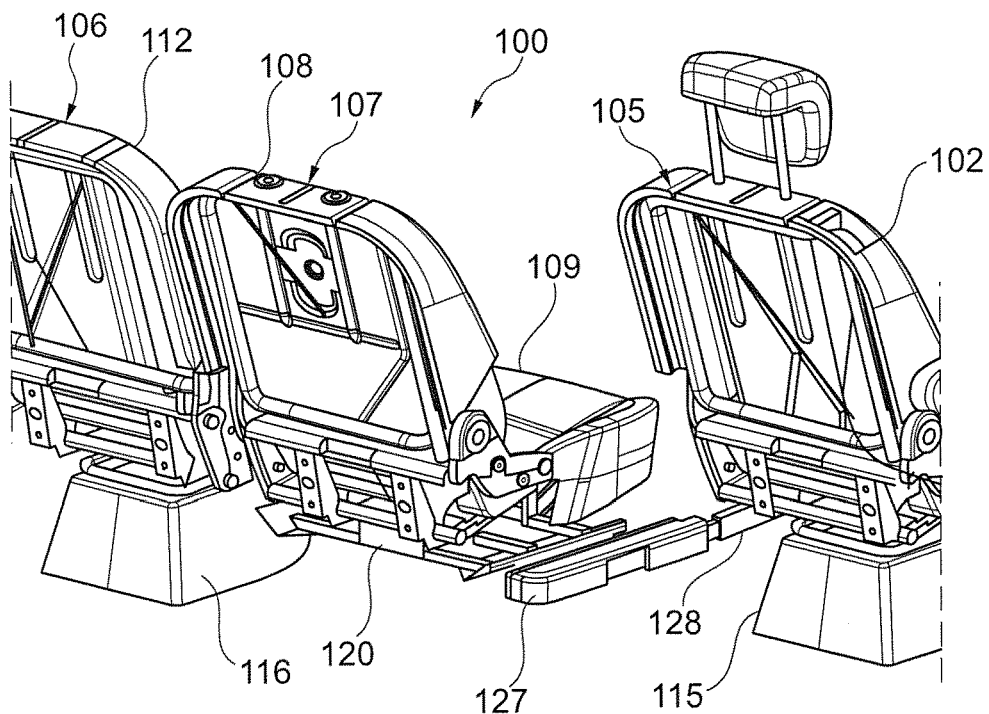
FIG. 1e is a rear right hand side perspective view of the seating arrangement of FIG. 1a showing the right hand seat in the rear access position shown in FIG. 1d.

In FIGS. 1d, 1e, 1g and 1h the right hand side outboard seat 105 is shown in a rear access position in which the respective seat pedestal 115 has been released and the seat pedestal along with the right hand outboard seat 105 has been slid towards a front end of the motor vehicle 1. In FIG. 1a the motor vehicle seating arrangement is shown in a normal seating position with all three seats 105, 106, 107 aligned in a row across the motor vehicle 1. In FIG. if the seats are in the same position as for FIG. 1a but the backrest 102 of the right hand side outboard seat 105 has been folded forward to a release position in which the right hand side seat 105 and its associated pedestal can be slid forward.

Figure 1F:
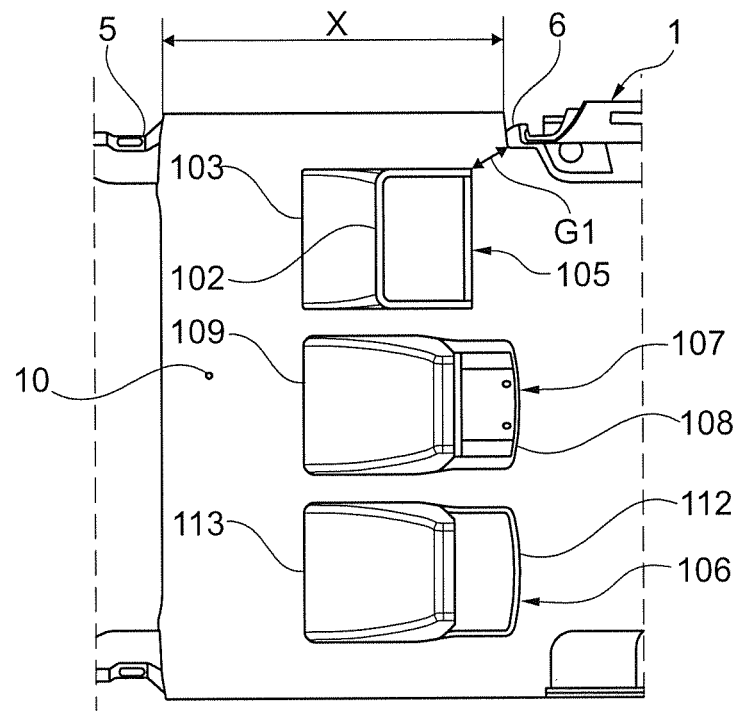
FIG. 1f is a schematic plan view showing the spacing of the right hand side outboard seat when in the normal seating position with reference to a rear edge of a side door aperture.
Figure 1G:
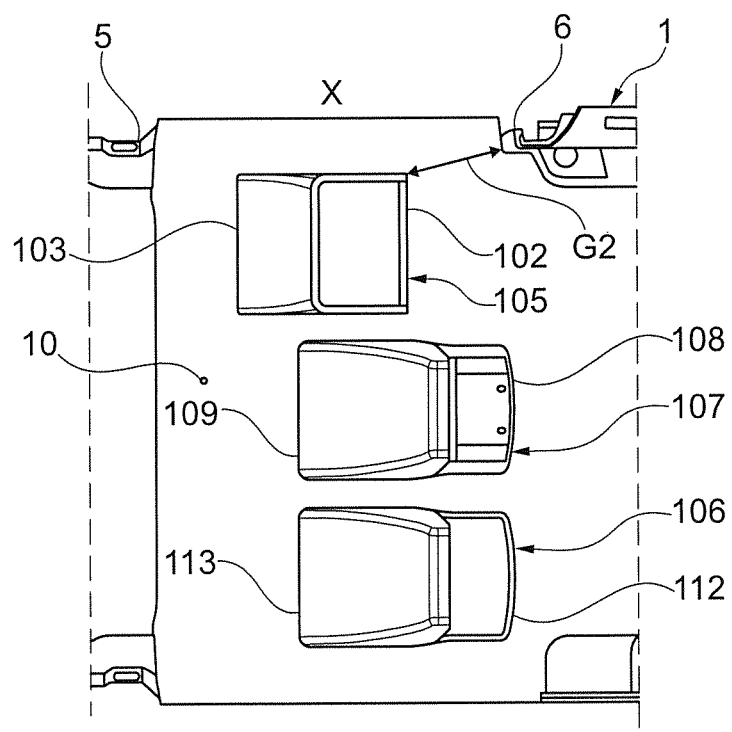
FIG. 1g is a schematic plan view similar to FIG. 1f but showing the spacing of the right hand side outboard seat when in the rear access position of FIGS. 1d and 1e with reference to the rear edge of the side door aperture.
Figure 1H:
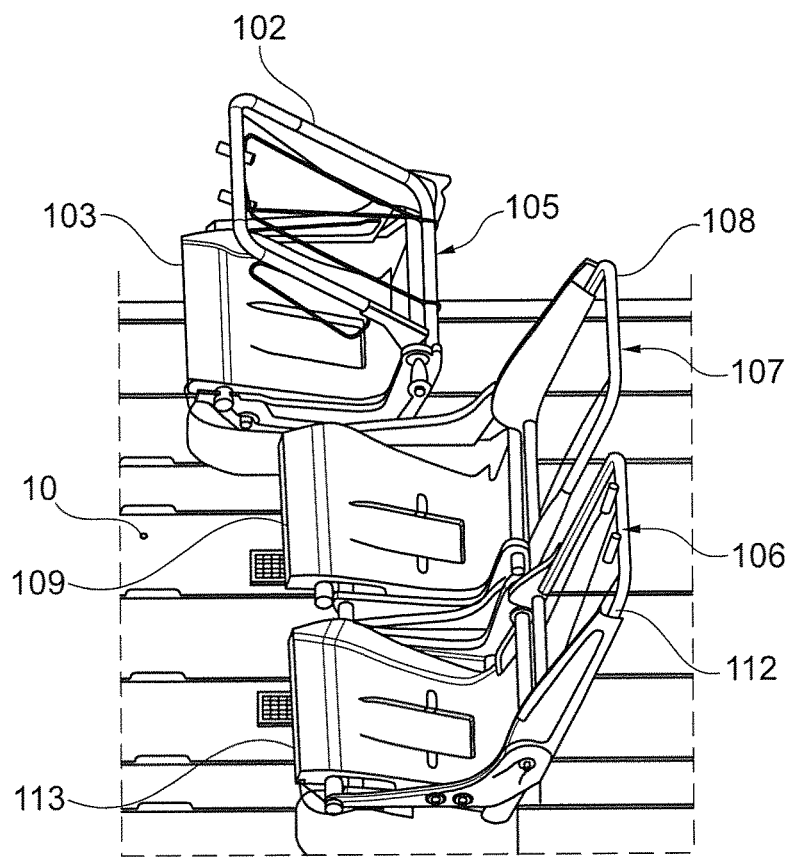
FIG. 1h is a left hand perspective view as viewed from above showing the seats in an un-upholstered form with the right hand side outboard seat in the rear access position.

As can best be seen with reference to FIGS. 1f and 1g when the right hand side outboard seat 105 is in the normal seating position a gap 'G1' is provided between the respective seat 105 and a rear upright 6 of a door aperture of width 'X' defined between the rear upright 6 and a front upright 5. However, when the right hand side outboard seat 105 is moved to a rear access position as shown in FIG. 1g, the gap is increased to width 'G2' due to the forward movement of the right hand side outboard seat 105. It will be noted that one advantage is that the central seat 107 and the left hand side outboard seat 106 do not need to be moved to provide this additional room for entry or egress from the motor vehicle 1.

In the case of the embodiment described it will be appreciated that the left hand side outboard seat 106 can be moved in a similar manner so that improved rear seat access can be provided on both sides of the motor vehicle 1. In such a case the central seat 107 and the right hand side outboard seat 105 are not moved from their normal seating positions and only the left hand side outboard seat 106 is moved.

It will be further appreciated that in an alternative embodiment not shown, one side of the central seat can be slidingly attached to one of the two outboard seats and the other side can be releasably connected to the other of the two outboard seats such that no relative fore-aft movement is provided between the central seat and the other of the two outboard seats.

With such an arrangement, improved rear seat access would be provided by sliding forward the one outboard seat slidingly connected to the central seat with the other two seats remaining in the same position. However, improved rear access is only provided on one side of the motor vehicle with such an arrangement.

Figure 1I:
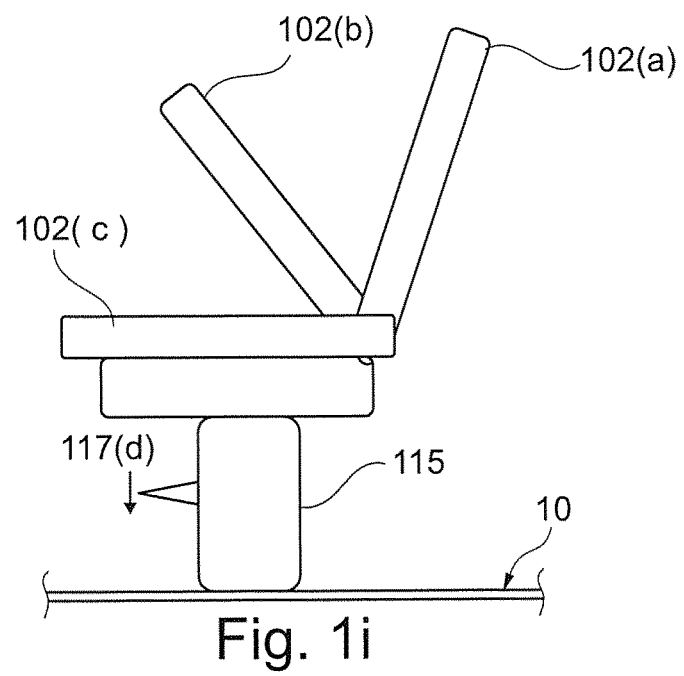
FIG. 1i is a schematic view showing various operational positions of the left hand side outboard seat.

With particular reference to FIG. 1i various operational positions of the right hand side outboard seat 105 are shown. It will be appreciated that the same operational positions and functionality is present on the left hand side outboard seat 106.

When the backrest 102 of the right hand side outboard seat 105 is in the position 102(a) all of the various latches are in their respective fully latched states and the respective seat 105 is in a normal use seating state.

When the backrest 102 is in the position 102(b) in which it has been folded forward approximately 45 degrees from a normal upright position indicated by the reference numeral 102(a), the latches holding the seat pedestal 115 to the floor 10 are released so as to permit forward and rearward sliding movement of the seat pedestal 115 and the associated seat 105 relative to the floor 10 and a slide latch (not shown) associated with the slide mechanism are released allowing relative movement between the slide arms 127, 128.

When the backrest 102 is in the position 102(c) in which it has been folded forward approximately 125 degrees from the normal upright position indicated by the reference numeral 102(a) so as to lie flat upon the seat base 103 and the latches holding the seat pedestal 115 to the floor 10 are engaged so as to prevent forward and rearward movement of the seat pedestal 115 and the associated seat 105 relative to the floor 10 and the slide latch associated with the slide mechanism is latched so as to prevent relative movement between the slide arms 127, 128.

Irrespective of the position of the seat backrest 102, if the release lever 117 provided on the seat pedestal 115 is moved to a release position as indicated by the arrow 117(d) then this will fully release the associated floor latches thereby allowing the right hand side outboard seat 105 and the associated pedestal 115 to be removed from the motor vehicle 1.

Therefore, in summary, by suspending the central seat 107 between the two outboard seats 105, 106 the weight of the central seat 107 is considerably reduced due to the absence of a seat pedestal and a large storage space is provided under the central seat 107. By using sliding connections between the central seat 107 and the two outboard seats 105, 106 permits either one of the outboard seats 105, 106 to be moved forward to provide improved access to third row seating 7 (shown in dotted outline on FIG. 5) located behind the motor vehicle seating arrangement 100 which forms second row seating in the case of this example.

It will be appreciated that in the case of a motor vehicle having only two rows of seats the motor vehicle seating arrangement 100 could be used with advantage as a front row of seats. It will also be appreciated that the central seat could be replaced by an alternative item of utility for use by occupants of the motor vehicle such as for example, a child seat assembly, a table, an entertainment center, a storage box and a storage locker. The item of utility may be slidingly supported by the two outboard seats in a similar manner to that described so as to provide the additional storage under the item of utility while permitting either one of the outboard seats to be slid forward to provide improved rear access.

Figure 2D:
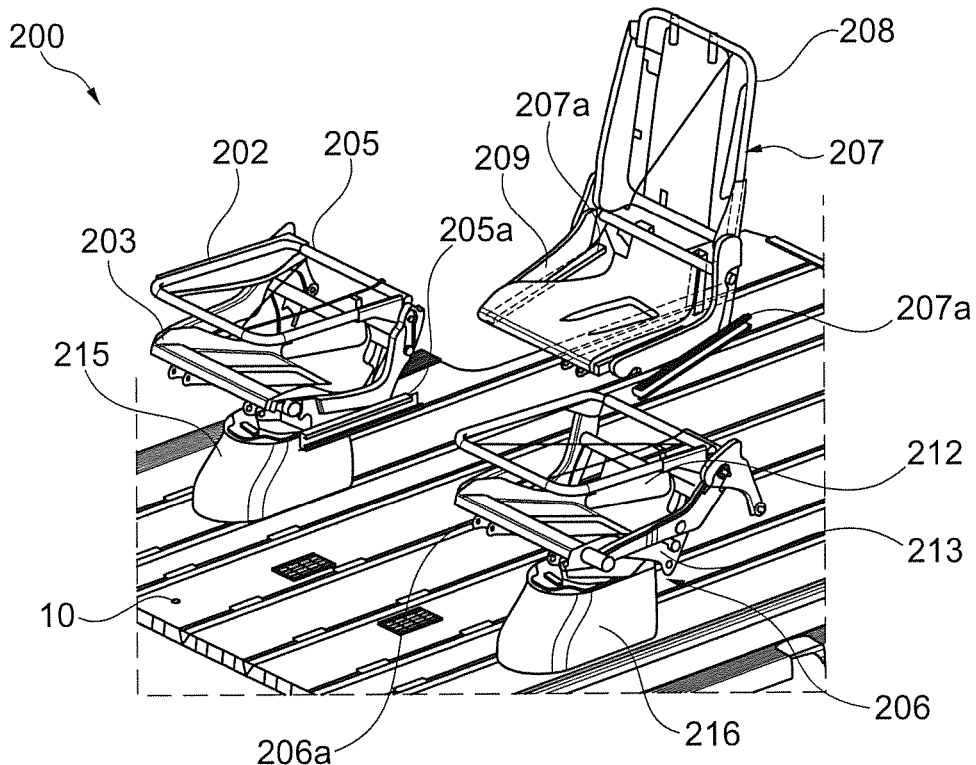
FIG. 2d is a front perspective view of the motor vehicle seating arrangement in accordance with the second embodiment shown diagrammatically in FIGS. 2a-2c prior to engagement of left and right hand slide rails on the central seat with left and right hand side support rails on the right and left hand side outboard seats respectively showing the structure of the seats.
Figure 2E:
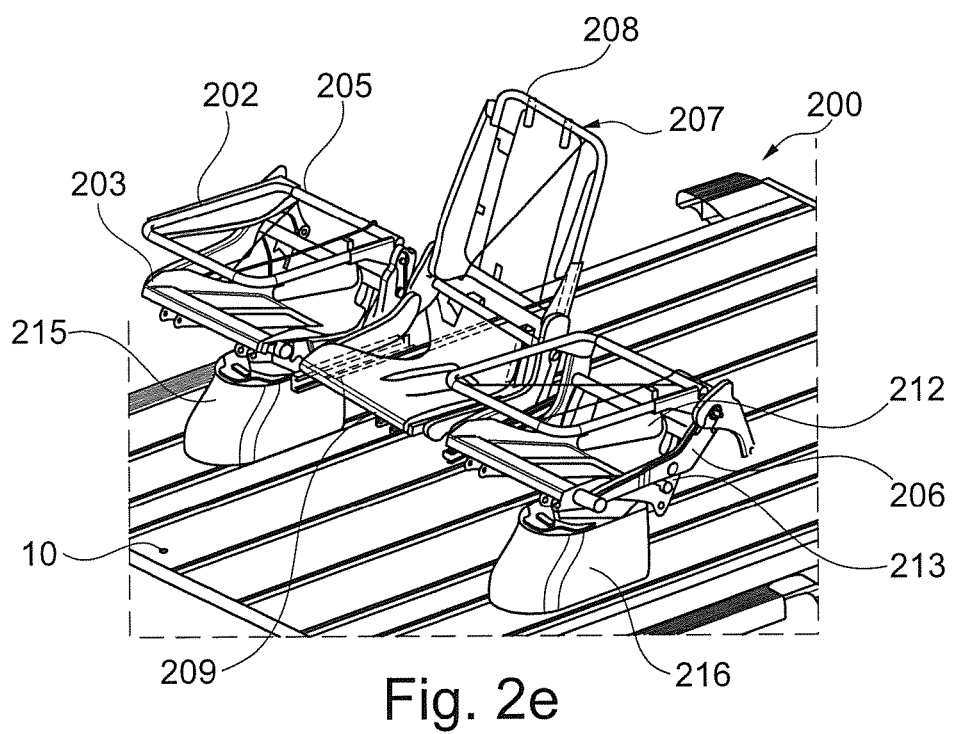
FIG. 2e is a view similar to FIG. 2d shown the central seat in position between the right and left hand side outboard seats with the central seat unlatched prior to removal of the central seat from its normal in use position.

With reference to FIGS. 2a to 2f there is shown a second embodiment of a motor vehicle seating arrangement which is in some respects the same as the first embodiment previously described in that it comprises a pair of outboard seats between which is supported an item of utility in the form of a central seat. The motor vehicle seating arrangement 200 comprises a right hand side outboard seat 205, a left hand side outboard seat 206 and a central seat 207 that is located in a gap defined between the pair of outboard seats 205, 206. It will be appreciated that the seats 205, 206, 207 as shown in FIGS. 2d and 2e face towards a front of the motor vehicle in which they are fitted and are shown without upholstery.

The right hand side outboard seat 205 has a backrest 202 and a seat base 203 and is mounted on a floor of a motor vehicle such as the floor 10 of the motor vehicle 1 shown in FIG. 5 via a seat pedestal 215. The seat pedestal 215 is moveably mounted on the floor 10 so as to be selectively slideable in a fore-aft direction of the motor vehicle 1. That is to say, the seat pedestal 215 can be slid forwards or rearwards relative to the floor 10 of the motor vehicle 1. A release lever (not shown) is provided on the seat pedestal 215 to release floor latches (not shown) used to hold the seat pedestal 215 in position on the floor 10. By fully releasing the floor latches, the seat pedestal 215 and the associated seat 205 can be removed from the motor vehicle 1.

The left hand side outboard seat 206 has a backrest 212 and a seat base 213 and is mounted on the floor 10 of the motor vehicle 1 via a seat pedestal 216. The seat pedestal 216 is moveably mounted on the floor 10 so as to be selectively moveable in a fore-aft direction of the motor vehicle 1. That is to say, the seat pedestal 216 can be slid forwards or rearwards relative to the floor 10 of the motor vehicle 1. A release lever (not shown) is provided on the seat pedestal 216 to release floor latches (not shown) used to hold the seat pedestal 216 in position on the floor 10. By fully releasing the floor latches, the seat pedestal 216 and the associated seat 206 can be removed from the motor vehicle 1.

The central seat 207 has a backrest 208 and a seat base 209 and is supported by the two outboard seats 205, 206 and is therefore referred to as a 'suspended seat' as there is no seat pedestal supporting the central seat 207. The use of a suspended seat arrangement for the second embodiment has the same advantages referred to with respect to the first embodiment of reduced weight and unobstructed space under the central seat 207 due to the lack of a seat pedestal.

In order to support the central seat 207 a pair of seat support members in the form of slide rails 207a are fastened to the seat base 209 for engagement with a pair of "U" shaped support rails 205a, 206a fastened to the seat bases 203, 213 of the right and left hand side outboard seats 205 and 206 respectively.

It will be appreciated that there is a left hand slide rail 207a fastened to a left hand side of the seat base 209 for engagement with a support rail 206a fastened to a right hand side of the seat base 213 of the left hand side outboard seat 206 and a right hand slide rail 207a fastened to a right hand side of the seat base 209 for engagement with a support rail 205a fastened to a left hand side of the seat base 203 of the right hand side outboard seat 206.

The central seat 207 is therefore slidingly supported by the pair of outboard seats 205, 206 via a pair of slide mechanisms. A latching mechanism (not shown in detail) having a pair of spring biased latch pins 220 each of which is engageable with a respective detent 230 in the pair of slide rails 207a and is used to hold the central seat 207 in position when it is in a normal use position. Note that the end of the slide rails 207a are tapered and that the latch pins 220 have an angled face so that the detents 230 in the slide rails 207a can be engaged with the latch pins 220 without the need to operate the release mechanism for the latching mechanism, although the latching mechanism has to be released to remove the central seat 207.

In FIG. 2d the central seat 207 is shown being lifted into place prior to insertion of the pair of slide rails 207a with the support rails 205a, 206a, and the backrests 202, 212 are shown folded forward to release the latching mechanisms associated with the slide mechanisms, but as referred to above this is not essential.

In FIGS. 2a and 2f the slide rail 207a is shown being inserted into the support rail 205a during mounting of the central seat 207 in the motor vehicle 1. An end stop 225 is provided on each support rail 205a, 206a to assist with positioning of the slide rails 207a in the support rails 205a, 206a.

In FIG. 2b the position of the slide rail 207a is shown when the central seat 207 is in a normal seating position. In this normal seating position the slide rails 207a abut against the end stops 225, the pair of latch pins 220 are fully engaged with the detents 230 and the central seat 207 is aligned with two outboard seats 205, 206 so as to form a row of seats extending across the motor vehicle 1.

In FIG. 2c the right hand side outboard seat 205 has been moved forwards in the direction of arrow "F" to a rear access position in which it has been slid forward with respect to the central seat 207 and the left hand side outboard seat 206 both of which remain in their normal seating positions. In order to move the right hand side outboard seat 205 the backrest 202 of the right hand side outboard seat 205 is folded forward so as to lie flat on the seat base 203 thereby releasing the latch pin 220 engaged with the detent 230 in the slide rail 207a on the right hand side of the seat base 209 of the central seat 207. The seat pedestal 215 is then partially unlatched so as to permit the right hand side outboard seat 205 to be slid forward.

It will be appreciated that the left hand side outboard seat 206 can be moved into a rear access position in a similar manner while the central seat 207 and the right hand side outboard seat 205 remain in their normal seating positions.

As shown in FIG. 2e the central seat 207 is removable from the seating arrangement 200 by folding forward both of the backrests 202, 212 of the outboard seats 205, 206 so that each backrest 202, 212 lies flat upon the respective seat base 203, 213 of the outboard seat 205, 206 of which it forms a part. The folding forward of the backrests 202, 212 has the effect of releasing the latching mechanism of the slide mechanism, thereby withdrawing the latch pins 220 from the detents 230. The releasing of the latching mechanism allows the central seat 207 to be slid out in a rearward direction from between the two outboard seats 205, 206.

One advantage of providing a sliding interconnection between the two outboard seats 205, 206 and the central seat 207 is that it allows either of the outboard seats 205, 206 to be moved forward to provide better access to a further row of seats to the rear of the seating arrangement 200 without requiring all of the seats 205, 206, 207 forming the motor vehicle seating arrangement 200 to be moved. It will be appreciated that it is a far easier task to move one seat rather than three.

It will be appreciated that, in the case of a motor vehicle having only two rows of seats, the motor vehicle seating arrangement 200 can advantageously be used as a front row of seats. It will also be appreciated that the central seat could be replaced by an alternative item of utility for use by occupants of the motor vehicle such as for example and without limitation, a child seat, a table, an entertainment center, a storage box and a storage locker. In such a case the item of utility would be slidingly supported by the two outboard seats in a similar manner to that described with respect to the central seat 207 so as to provide the additional storage under the item of utility while permitting one or other of the outboard seats to be slid forward to provide improved rear access.

Figure 3A:
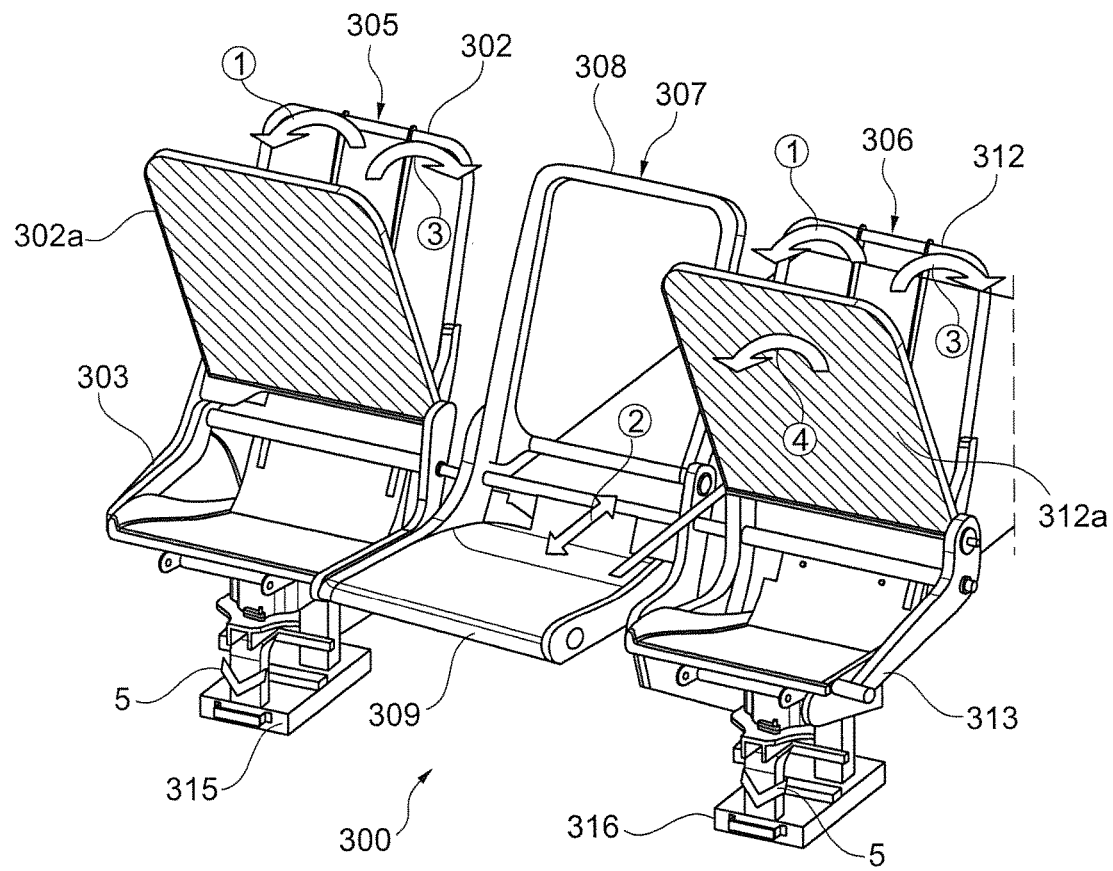
FIG. 3a is a front left hand perspective view showing only the structure of the seats forming a third embodiment of a motor vehicle seating arrangement showing the seats in a normal seating position in which all of the seats making up the seating arrangement are aligned with one another and indicating the position that backrests of the right hand and left hand side outboard seats are moved to in order to release a central seat.

With reference to FIGS. 3a-3e there is shown a third embodiment of a motor vehicle seating arrangement which is in some respects the same as the first and second embodiments previously described in that it comprises a pair of outboard seats between which is supported an item of utility in the form of a central seat. The motor vehicle seating arrangement 300 comprises a right hand side outboard seat 305, a left hand side outboard seat 306 and a central seat 307 that is located in a gap between the pair of outboard seats 305, 306. It will be appreciated that the seats 305, 306, 307 as shown in FIG. 3a face towards a front of the motor vehicle in which they are fitted and are shown without upholstery.

The right hand side outboard seat 305 has a backrest 302 and a seat base 303 and is mounted on a floor of a motor vehicle via a seat pedestal 315. The seat pedestal 315 is moveably mounted on the floor 10 so as to be selectively slideable in a fore-aft direction of the motor vehicle. That is to say, the seat pedestal 315 can be slid forwards or rearwards relative to the floor of the motor vehicle. A release lever (the release action of which is indicated by the winged arrow 5 overlying the pedestal 315) is provided on the seat pedestal 315 to release floor latches (not shown) used to hold the seat pedestal 315 in position on the floor. By fully releasing the floor latches, the seat pedestal 315 and the associated seat 305 can be removed from the motor vehicle.

The left hand side outboard seat 306 has a backrest 312 and a seat base 313 and is mounted on the floor of the motor vehicle via a seat pedestal 316. The seat pedestal 316 is moveably mounted on the floor so as to be selectively moveable in a fore-aft direction of the motor vehicle. That is to say, the seat pedestal 316 can be slid forwards or rearwards relative to the floor of the motor vehicle. A release lever (the release action of which is indicated by the winged arrow 5 overlying the pedestal 316) is provided on the seat pedestal 316 to release floor latches (not shown) used to hold the seat pedestal 316 in position on the floor. By fully releasing the floor latches the seat pedestal 316 and the associated seat 306 can be removed from the motor vehicle.

The central seat 307 has a backrest 308 and a seat base 309 and is supported by the two outboard seats 305, 306, that is to say, it is a 'suspended seat' as there is no seat pedestal supporting the central seat 307. The suspended seat arrangement of the third embodiment has the same advantages referred to with respect to the first and second embodiments of reduced weight and unobstructed space under the central seat 307 due to the lack of a seat pedestal.

In order to support the central seat 307, a pair of seat support members in the form of slide rails 307a (see FIGS. 3b-3e) are fastened to the seat base 309 for engagement with a pair of "U" shaped support rails 305a fastened to the seat bases 303, 313 of the right and left hand side outboard seats 305 and 306, respectively.

Figure 3F:
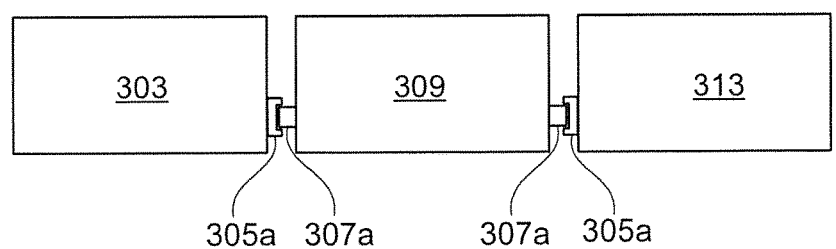
FIG. 3f is a schematic front view of the seating arrangement shown in FIG. 3a showing the manner in which the central seat is slidingly supported by the outboard seats.

As shown in FIG. 3f there is a left hand slide rail 307a fastened to a left hand side of the seat base 309 for engagement with a support rail 305a fastened to a right hand side of the seat base 313 of the left hand side outboard seat 306 and a right hand slide rail 307a fastened to a right hand side of the seat base 309 for engagement with a support rail 305a fastened to a left hand side of the seat base 303 of the right hand side outboard seat 306.

The central seat 307 is therefore slidingly connected to the pair of outboard seats 305, 306 via a pair of slide mechanisms. A latching mechanism (not shown in detail) having a pair of spring biased latch pins 320 each of which is engageable with a respective detent 330 in the pair of slide rails 307a is used to hold the central seat 307 in position when it is in a normal use position. Note that in the case of the third embodiment both ends of the slide rails 307a are tapered so that the slide rails 307a can be inserted from the front (see FIG. 3c) or from the rear (see FIG. 3b). The latch pins 320 have a tapered end with two inclined faces so that the detents 330 in the slide rails 307a can be engaged with the latch pins 320 without the need to operate the release mechanism for the latching mechanism.

Figure 3B:
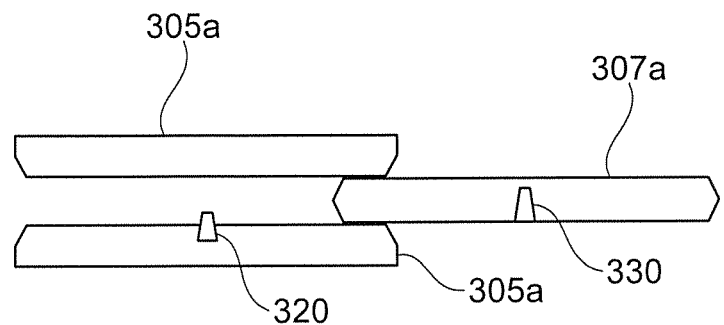
FIG. 3b is a diagrammatic side view of support parts of the third embodiment of a motor vehicle seating arrangement shown in FIG. 3a showing a right hand slide rail of the central seat being inserted from the rear into a left hand side support rail of the right hand side outboard seat.

In FIG. 3b the slide rail 307a is shown being inserted into the support rail 305a from the rear during mounting of the central seat 307 in the motor vehicle 1. The tapered ends of the slide rails 307a will react against the inclined faces of the latch pins 320 thereby pushing the latch pins 320 out of the way until they can engage with the detents 330.

Figure 3C:
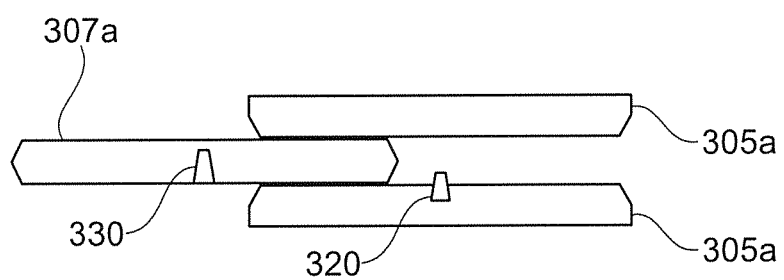
FIG. 3c is a diagrammatic side view of support parts of the third embodiment of a motor vehicle seating arrangement shown in FIG. 3a showing an alternative to the assembly step of FIG. 3b in which the right hand slide rail of the central seat is being inserted from the front into the left hand side support rail of the right hand side outboard seat.

In FIG. 3c which is an alternative to FIG. 3b, the slide rail 307a is shown being inserted into the support rail 305a from the front during mounting of the central seat 307 in the motor vehicle 1. As before, the tapered ends of the slide rails 307a will react against the inclined faces of the latch pins 320 thereby pushing the latch pins 320 out of the way until they can engage with the detents 330.

Figure 3D:
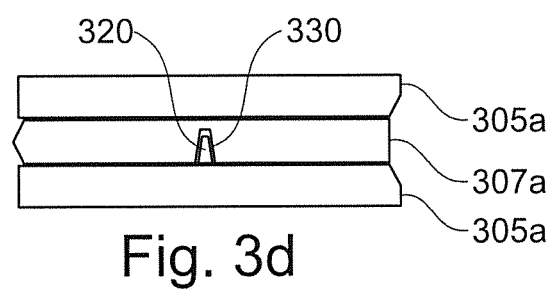
FIG. 3d is a diagrammatic side view similar to FIGS. 3b and 3c but showing the right hand slide rail of the central seat located and latched in the left hand side support rail of the right hand side outboard seat in the normal seating position.
Figure 3E:
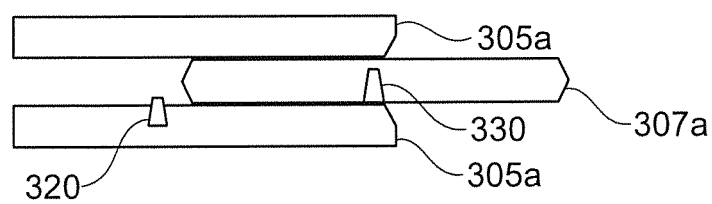
FIG. 3e is a diagrammatic side view similar to FIGS. 3b-3d but showing the arrangement of the right hand slide rail of the central seat and the left hand side support rail of the right hand side outboard seat when the right hand side outboard seat has been moved forward into a rear access position.

In FIG. 3d the position of the slide rail 307a is shown when the central seat 307 is in a normal seating position in which the pair of latch pins 320 are fully engaged with the detents 330 in the slide rails 305a and the central seat 307 is aligned with two outboard seats 305, 306 so as to form a row of seats extending across the motor vehicle.

Referring back to FIG. 3a, the central seat 307 is removable from the seating arrangement 300 by folding forward both of the backrests 302, 312 of the outboard seats 305, 306 by approximately 45 degrees as indicated by the arrows 1 to the positions 302a and 312a. The central seat 307 can then be slid out in a forward or rearward direction as indicated by the double headed arrow 2, and the backrest 302, 312 can then be returned to their normal positions as indicated by the arrows 3.

The folding forward of the backrests 302, 312 has the effect of releasing the latching mechanisms of the slide mechanisms thereby withdrawing the latch pins 320 from the detents 330 which allows the central seat 307 to be slid out from between the two outboard seats 305, 306.

Also shown in FIG. 3a are the arrow 4 and the winged arrow 5 on the pedestal 316 which represent the actions required to move the left hand side outboard seat 306 to a rear access position in which it is slid forward with respect to the central seat 307 and the right hand side outboard seat 305 both of which remain in their normal seating positions.

In this position improved access to an area to the rear of the left hand side outboard seat 306 is provided.

In order to move the left hand side outboard seat 306 to the improved rear access position, the backrest 312 of the left hand side outboard seat 306 is folded forward by approximately 45 degrees from the normal use position as indicated by the arrow 4 to the position 312a, thereby releasing the latch pin 320 engaged with the detent 330 in the slide rail 307a on the left hand side of the seat base 309 of the central seat 307. The seat pedestal 315 is then partially unlatched by moving the release lever in the direction of the winged arrow 5 on the pedestal 316 so as to permit the left hand side outboard seat 306 to be slid forward.

It will be appreciated that the right hand side outboard seat 305 can be moved into an improved rear access position in a similar manner while both the central seat 307 and the left hand side outboard seat 306 remain in their normal seating positions.

As before, one advantage of providing a sliding interconnection between the two outboard seats 305, 306 and the central seat 307 is that it allows either of the outboard seats 305, 306 to be moved forward to provide better access to a further row of seats to the rear of the seating arrangement 300 without requiring all of the seats 305, 306, 307 forming the motor vehicle seating arrangement 300 to be moved. It will be appreciated that it is a far easier task to move one seat rather than three.

As before, in the case of a motor vehicle having only two rows of seats the motor vehicle seating arrangement 300 can advantageously be used as a front row of seats. It will also be appreciated that the central seat could be replaced by an alternative item of utility for use by occupants of the motor vehicle such as for example, a child seat, a table, an entertainment center, a storage box and a storage locker. In such a case the item of utility would be slidingly supported by the two outboard seats in a similar manner to that described with respect to the central seat 307 so as to provide the additional storage under the item of utility while permitting one or other of the outboard seats to be slid forward to provide improved rear access.

Figure 4A:
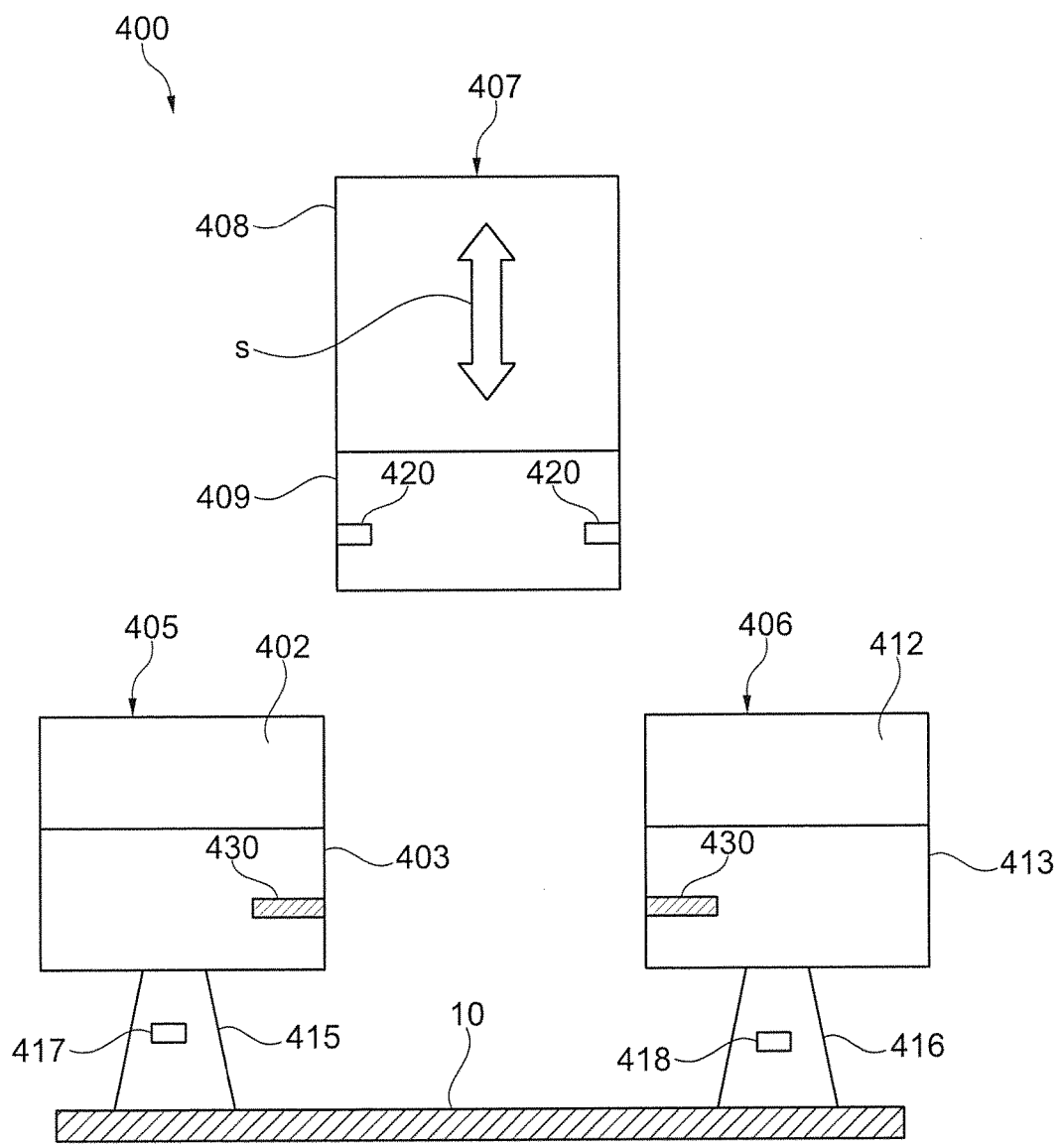
FIG. 4a is a diagrammatic front view of a fourth embodiment of a motor vehicle seating arrangement showing the insertion of a central seat between right and left hand side outboard seats with backrests of the outboard seats folded forward.
Figure 4B:
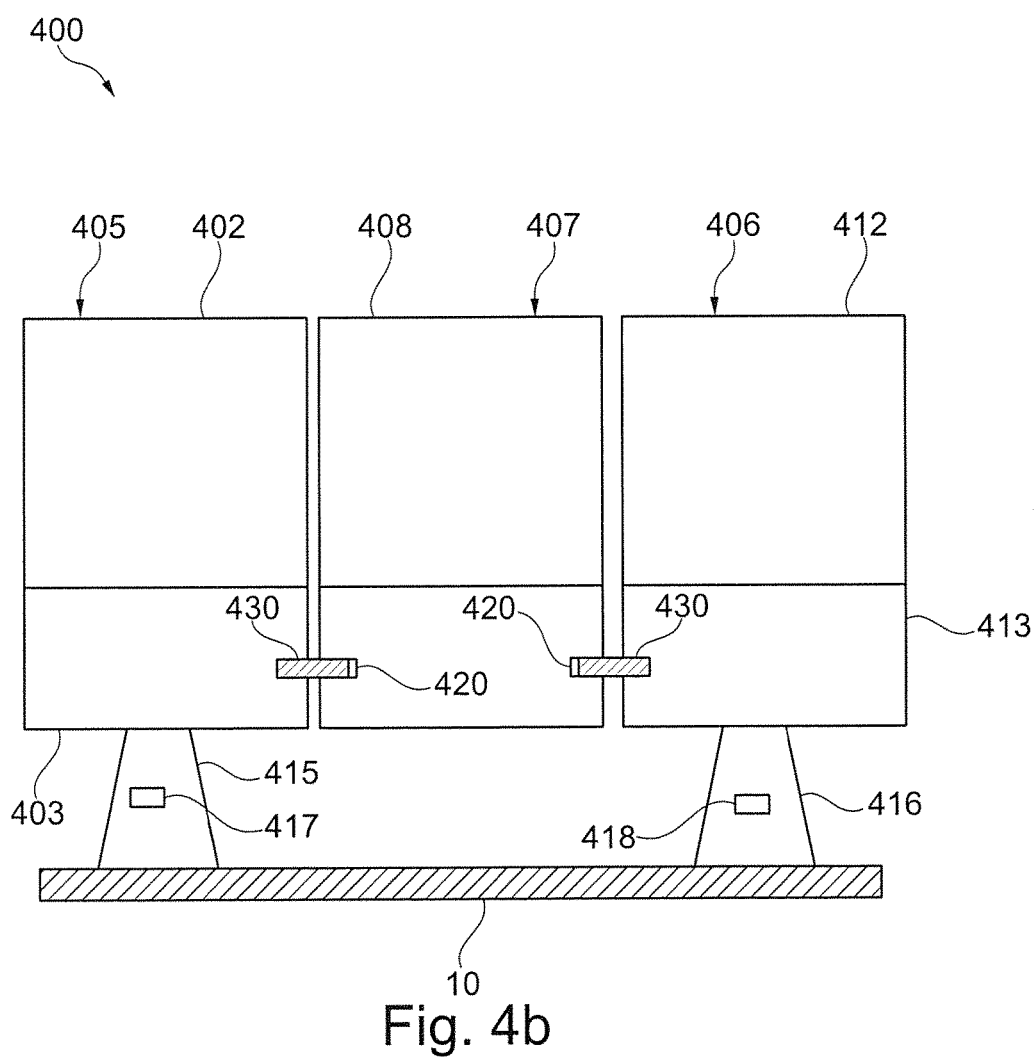
FIG. 4b is a diagrammatic front view of the fourth embodiment of a motor vehicle seating arrangement shown in FIG. 4a showing the central seat located between the right and left hand side outboard seats in a normal seating position.

With reference to FIGS. 4a and 4b there is shown a fourth embodiment of a motor vehicle seating arrangement which is in some respects the same as the other embodiments previously described in that it comprises a pair of outboard seats between which is supported an item of utility in the form of a central seat. The motor vehicle seating arrangement 400 comprises a right hand side outboard seat 405, a left hand side outboard seat 406 and a central seat 407 that is located in a gap defined between the pair of outboard seats 405, 406. It will be appreciated that the seats 405, 406, 407 as shown in FIGS. 4a and 4b face towards a front of the motor vehicle in which they are fitted.

The right hand side outboard seat 405 has a backrest 402 and a seat base 403 and is mounted on a floor of a motor vehicle such as the floor 10 of the motor vehicle 1 shown in FIG. 5 via a seat pedestal 415. The seat pedestal 415 is moveably mounted on the floor 10 so as to be selectively slideable in a fore-aft direction of the motor vehicle 1. That is to say, the seat pedestal 415 can be slid forwards or rearwards relative to the floor 10 of the motor vehicle 1.

A release lever 417 is provided on the seat pedestal 415 to release floor latches (not shown) used to hold the seat pedestal 415 in position on the floor 10. By partially releasing the floor latches the seat pedestal 415 and the associated seat 405 can be slid forwards and rearwards and, by moving the lever 417 to a fully released position, the floor latches are fully released and seat 405 can be removed from the motor vehicle 1.

The left hand side outboard seat 406 has a backrest 412 and a seat base 413 and is mounted on the floor 10 of the motor vehicle 1 via a seat pedestal 416. The seat pedestal 416 is moveably mounted on the floor 10 so as to be selectively moveable in a fore-aft direction of the motor vehicle 1. That is to say, the seat pedestal 416 can be slid forwards or rearwards relative to the floor 10 of the motor vehicle 1.

A release lever 418 is provided on the seat pedestal 416 to release floor latches (not shown) used to hold the seat pedestal 416 in position on the floor 10. By partially releasing the floor latches the seat pedestal 416 can be slid forwards and rearwards and moving the lever 418 to a fully released position fully releases the floor latches and the seat 406 can then be removed from the motor vehicle 1.

The central seat 407 has a backrest 408 and a seat base 409 and is supported by the two outboard seats 405, 406 and is therefore a 'suspended seat' as there is no seat pedestal supporting the central seat 407. The suspended seat arrangement of this embodiment has the same advantages referred to with respect to the previous embodiments of reduced weight and unobstructed space under the central seat 407 due to the lack of a seat pedestal.

In order to support the central seat 407 four seat support members in the form of detents 420 formed in pairs in left and right hand side structures of the seat base 409 respectively are arranged for engagement by two pairs of locking bolts 430 slidingly supported by the left hand side structure of the seat base 403 of the right hand side outboard seat 405 and a pair of locking bolts 430 slidingly supported by the right hand side structure of the seat base 413 of the left hand side outboard seat 406.

A release mechanism (not shown) is used to retract the bolts 430 into the position shown in FIG. 4a when the two backrests 402, 412 are folded forward by a predefined angle which, in the case of FIG. 4a, is angled such that the backrests 402, 412 lie upon the seat bases 403, 413.

As shown by the double headed arrow S on FIG. 4a the central seat 407 can be inserted or removed from the gap between the pair of outboard seats 405, 406 by lowering it into place in the gap or lifting it out of the gap. It will be appreciated that in practice end stops or guides are provided to assist with the alignment of the bolts 430 with the detents 420. As shown in FIG. 4b, when the central seat 407 is position, the backrests 402, 412 are returned to their normal upright positions, this causes the bolts 430 to engage with the detents 420.

The fourth embodiment has the advantage of providing additional storage space under the central seat 407 as per the other embodiments but may be considered inferior to the previous embodiments in that all three seats 405, 406, 407 have to be slid forward to provide improved rear access. The fourth embodiment is however of a less complicated construction and so is more economical to manufacture.

In order to provide improved rear access, the latches for both of the pedestals 415, 416 have to be released by operation of the lever 417, 418 to allow the three seats 405, 406, 407 to be slid forward from their normal seating positions.

As before in the case of a motor vehicle having only two rows of seats the motor vehicle seating arrangement 400 could be used as a front row of seats.

It will also be appreciated that the central seat could be replaced by an alternative item of utility for use by occupants of the motor vehicle such as for example, a child seat, a table, an entertainment center, a storage box and a storage locker. In such a case the item of utility would be supported by the two outboard seats in a similar manner to that described above with respect to the central seat 407 so as to provide the additional storage under the item of utility.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A motor vehicle seating arrangement comprising:
a pair of outboard seats spaced apart to define therebetween a gap; and
a central seat having a backrest and a seat base fitted in the gap and supported solely by the two outboard seats, wherein the seat base is mounted on a seat support member having recesses on a side to connect the seat support member to support pins forming part of a slide mechanism.

2. The motor vehicle seating arrangement as claimed in claim 1, wherein the central seat is supported on a left hand side by a left hand side one of the pair of outboard seats.

3. The motor vehicle seating arrangement as claimed in claim 2, wherein the central seat is slidingly supported on the left hand side by a sliding connection with the left hand side one of the pair of outboard seats.

4. The motor vehicle seating arrangement as claimed in claim 3, wherein the central seat is supported on a right hand side by a right hand side one of the pair of outboard seats.

5. The motor vehicle seating arrangement as claimed in claim 4, wherein the central seat is slidingly supported on a right hand side by a sliding connection with the right hand side one of the pair of outboard seats.

6. The motor vehicle seating arrangement as claimed in claim 1, wherein the seat base of the central seat is mounted on the seat support member and the seat support member has a pair of recesses on a left hand side used to connect the seat support member on the left hand side to a pair of support pins forming part of the slide mechanism located on the left hand side one of the pair of outboard seats.

7. The motor vehicle seating arrangement as claimed in claim 1, wherein the slide mechanism located on the left hand side one of the pair of outboard seats is fastened to a seat pedestal of the left hand side one of the pair of outboard seats.

8. The motor vehicle seating arrangement as claimed in claim 1, wherein the seat base of the central seat is mounted on the seat support member and the seat support member has a pair of recesses on a right hand side used to connect the seat support member on the right hand side to a pair of support pins forming part of the slide mechanism located on the right hand side one of the pair of outboard seats.

9. The motor vehicle seating arrangement as claimed in claim 8, wherein the slide mechanism located on the right hand side one of the pair of outboard seats is fastened to a seat pedestal of the right hand side one of the pair of outboard seats.

10. The motor vehicle seating arrangement as claimed in claim 1, wherein each of the outboard seats has a backrest, a seat base and a seat pedestal for mounting the respective seat on a floor of a motor vehicle.

11. The motor vehicle seating arrangement as claimed in claim 10, wherein each of the seat pedestals includes a floor latch mechanism and, when the floor latch mechanism is fully released, the respective seat of which the pedestal forms a part is removable from the motor vehicle.

12. The motor vehicle seating arrangement as claimed in claim 11, wherein when the floor latch mechanism is partially released the respective seat of which the pedestal forms a part is slideable in a fore-aft direction of the motor vehicle.

13. The motor vehicle seating arrangement as claimed in claim 1, wherein the seating arrangement is a second row seating arrangement.

14. A vehicle seating arrangement comprising:
a pair of outboard seats spaced apart in a vehicle to define therebetween a gap; and
a central seat fitted in the gap and supported solely by the two outboard seats, wherein the central seat has a backrest and a seat base by which it is supported, the seat base of the central seat is mounted on a seat support member and the seat support member has recesses on a side used to connect the seal support member on t side to support pins forming part of a slide mechanism.

15. The vehicle seating arrangement as claimed in claim 14, wherein the central seat is supported on a left hand side by a left hand side one of the pair of outboard seats, and wherein the central seat is slidingly supported on the left hand side by a sliding connection with the left hand side one of the pair of outboard seats.

16. The vehicle seating arrangement as claimed in claim 15, wherein the central seat is supported on a right hand side by a right hand side one of the pair of outboard seats, and wherein the central seat is slidingly supported on a right hand side by a sliding connection with the right hand side one of the pair of outboard seats.

17. The vehicle seating arrangement as claimed in claim 14, wherein the seat support member has a pair of recesses on a left hand side used to connect the seat support member on the left hand side to a pair of support pins forming part of the slide mechanism located on the left hand side of the pair of outboard seats.

18. The vehicle seating arrangement as claimed in claim 14, wherein the seat base of the central seat is mounted on the seat support member and the seat support member has a pair of recesses on a right hand side used to connect the seat support member on the right hand side to a pair of support pins forming part of the slide mechanism located on the right hand side one of the pair of outboard seats.

* * * * *

UNITED STATES PATENT AND TRADEMARK OFFICE
CERTIFICATE OF CORRECTION

PATENT NO. : 10,189,378 B2  
APPLICATION NO. : 15/927438  
DATED : January 29, 2019  
INVENTOR(S) : Jackson et al.

Page 1 of 1

It is certified that error appears in the above-identified patent and that said Letters Patent is hereby corrected as shown below:

In the Claims

Column 14:  
Line 33:  
"seal" should be --seat--.  
Line 34:  
"on t side" should be --on the side--.

Signed and Sealed this  
Twenty-eighth Day of January, 2020

Andrei Iancu  
*Director of the United States Patent and Trademark Office*